United States Patent [19]
Takahashi et al.

[11] Patent Number: 4,729,631
[45] Date of Patent: Mar. 8, 1988

[54] REAR PROJECTION SCREEN

[75] Inventors: Hideo Takahashi, Yokohama; Masao Inoue, Tokyo; Shingo Suzuki; Yasuaki Nakanishi, both of Zama, all of Japan

[73] Assignee: Mitsubishi Rayon Co., Ltd., Tokyo, Japan

[21] Appl. No.: 43,025

[22] Filed: Apr. 27, 1987

[30] Foreign Application Priority Data

Apr. 30, 1986 [JP] Japan .................................. 61-100452

[51] Int. Cl.⁴ .............................................. G03B 21/60
[52] U.S. Cl. ................................................... 350/129
[58] Field of Search ................................. 350/127–129, 350/167; 353/26 R, 27 R, 74, 81, 77, 78

[56] References Cited

U.S. PATENT DOCUMENTS 3,236,150  2/1966  Miller ............................ 350/129 X
3,463,569  8/1969  Bratkowski ........................ 350/129
4,185,901  1/1980  Behr ............................. 350/127 X
4,482,206 11/1984  Van Breemen ...................... 350/128
4,512,631  4/1985  Van Breemen ...................... 350/128
4,674,836  6/1987  Yata et al. ....................... 350/128

Primary Examiner—Richard A. Wintercorn
Attorney, Agent, or Firm—Brumbaugh, Graves, Donohue & Raymond

[57] ABSTRACT

Provided is a rear projection screen apparatus having a rear projection screen, light rays from a projecter being incident upon the rear surface of the rear projection screen at steep angles, wherein a plurality of elongated prisms are formed on the rear surface of the screen, each prism having a reflection surface extending therealong, thereby the incedence light rays are internally reflected, and then transmitted through the medium of screen for emerging from the front surface of the screen on the viewing side, and the rear surface of the screen is in a curve shape which is convex toward the viewing side so that the brightness of the screen can be made to be uniform.

13 Claims, 19 Drawing Figures

REAR PROJECTION SCREEN

BACKGROUND OF THE INVENTION

The present invention relates to a rear projection screen for use in a projection television set and the like.

As shown in FIG. 15, a rear projector used in a video projection television set is adapted to expand light emerging from a light source P, e.g. a CRT, by means of a lens system L, project the light from the rear side of a screen S and allow a viewer to observe a picture from the opposite side of the screen S. However, if the distance from the light source P to the screen S is prolonged as shown, the projector becomes large size. In practice, therefore, a method is adapted whereby one to three mirrors M are combined, and the light is projected after being reflected on them once, as shown in FIGS. 16A, 16B, 16C. However, there have been drawbacks in that, in the method of FIG. 16A, the height of the projector becomes large, while, in the methods of FIGS. 16B and 16C, it cannot be said positively that the projectors have been made sufficiently compact in terms of the height and depth.

To overcome these drawbacks, a rear projection screen has been proposed for observing an image by introducing light at a sharp angle from the rear, characterized in that a plurality of prisms are provided in parallel with each other on the light incidence surface, each having a total reflection surface, so that the incident light is totally reflected on the total reflection surface of the screen and is then emerged from the front viewing surface of the screen (refer to Japanese Pat. Application No. 29964/1984, U.S. Pat. Application Nos. 837,412 filed March 7, 1986, now U.S. Pat. No. 4,674,836, issued June 23, 1987 and 925,723).

Explanation will be made to the abovementioned rear projection screen proposed by the abovementioned U.S. Pat. Application Nos. 837,412 and 925,723 with reference to FIG. 1 in which like reference characters designate like or corresponding parts as shown in FIG. 15.

Light introduced from a light source P is made incident upon the rear surface of the rear projection screen S at a relatively large incident angle. The angle $\theta$ of incidence is generally dependent upon the distance of light projection, but preferably is in a range from 40to 85 deg. The distance $1'$ from the light source P to the rear projection screen S can be made to be shorter than the distance 1 shown in FIG. 15 by a relatively large incident angle $\theta$ within a range as mentioned above or by making the light from the light source P incident upon the rear surface of the screen S at an acute angle to the latter. Since the light source P is located obliquely downward, a distance $1'$ in the direction of the depth is:

$$1' = 1 \cos \theta$$

so that e′, can be made relatively small in comparison with e.

However, since the height of the projection set may not be always made sufficiently low, it is desirable in practice to reduce the height by employing a mirror $M_1$, as shown in FIG. 2A, and to reduce the length in the direction of the depth as well. In addition, in order to further reduce the height so as to make the overall dimensions smaller, two mirrors $M_2$ and $M_3$ may be combined as shown in FIG. 2B, and the light source P may be interposed between the rear projection screen S and the first mirror $M_2$ so as to project the light after being reflected twice.

FIG. 3 illustrates a portion of the rear projection screen mentioned above, and, a plurality of prisms having the same configuration are provided on the rear surface of the rear projection screen. In other words, these prisms are constituted by a plurality of prisms 1 extending along lines or concentric circular arcs in parallel and each prism 1 having a light incidence surface 1B and a light reflection surface 1A. A total reflection surface is formed on the light reflection surface 1A in such a manner that the light entering from the light incidence surface 1B is totally reflected and is then emerged from a front viewing surface.

As can be seen in FIG. 1, the light ray incident upon the rear projection screen S at the lower edge thereof has an incidence angle smaller than that of the light ray incident at the upper edge thereof. That is, the higher the incident position of the light ray on the rear projection screen, the greater the incidence angle of the right ray becomes, in other word, the higher the incident position of the light ray, the lower the density of the light rays incident upon the rear projection screen would becomes, resulting in that a picture image projected on the screen from the light source cannot be uniformly focused over the entire surface of the rear projection screen if no correction measure is taken for the light source P. However, optical measures or electric measures are proposed to overcome the above-mentioned problem.

However, there is a drawback in the above-mentioned rear projection screen. That is, if the incidence angle of the light ray is comparatively small or if the relative height of the prisms is small with respect to the pitches thereof, that is the apex angle $\theta_1$ of the prisms is large, a part of light rays incident upon the rear surface of the screen S directly enters into the medium of the screen S without reflecting upon the light reflection surfaces 1A of the prisms. More specifically, referring to FIG. 4, of the light rays $\alpha$, the part of light rays $\beta$ reflects upon the light reflection surface 1A of each prism and emerges from the screen as effective light rays A to be viewed, but the other part of light rays directly enters into the medium of the screen as stray light rays denoted by the reference character B, resulting the efficiency of light to be viewed at the viewing side of the screen being lowered.

In order to overcome the above-mentioned drawback, it has been proposed to make the apex angle $\theta_1$ of the prisms small or to make the incidence angle $\theta$ of the light rays incident upon the screen.

However, it would be impractical to decrease the apex angle $\theta_1$ since the manufacture of such a kind of screen is difficult if the apex angle $\theta_1$ of the prisms becomes less than about 50 deg. Further, it is undesirable to increase the incidence angle $\theta$ since the above-mentioned uniform focussing problem would be serious if the incidence angle exceeds about 50 deg. at the center of the screen, resulting in difficulty in taking the above-mentioned correction measure at the light source P.

SUMMARY OF THE PRESENT INVENTION

The present invention has been achieved to overcome the above-mentioned drawback experienced in the rear projection screen proposed by the U.S. application Nos. 837,412 and 925,723.

A main object of the present invention is to provide a rear projection screen having a rear surface formed with several parallelly extending prisms for refracting and reflecting light rays received from a light source or projector, which can have a relatively high efficiency of light to be viewed.

A further object of the present invention is to provide a rear projection screen of the type mentioned above, in which the apex angle of the present invention can be made to be relatively large so that the production thereof can be facilitated.

According to the present invention, there is provided a rear projection screen having a front surface and a rear surface, in a rear projection apparatus which emerges light rays to be viewed to a viewing side, and which includes a light source with an optical axis along which light rays are projected onto the rear surface of the rear projection screen said front surface of the rear projection screen confronting the viewing side and a rear surface, the rear surface of the rear projection screen having a principle line extending thereon and crossing the optical axis of the light source at a relatively steep angle and being formed thereon with several prisms arranged in parallel with each other and being substantially orthogonal to the main principle line at least crossing points therebetween, each of the prism having an incidence surface through which the light rays from the light source are introduced into the prism, and a reflection surface upon which said light rays introduced are reflected to be directed toward the viewing surface of the rear projection screen, and further the rear surface having a concave cross-sectioned shape along the main principle line.

BRIEF DESCRIPTION OF THE DRAWINGS

The present invention will be detailed in a prefered embodiment form with reference to the drawings in which.

PREFERRED EMBODIMENTS OF THE INVENTION

Figure 5:
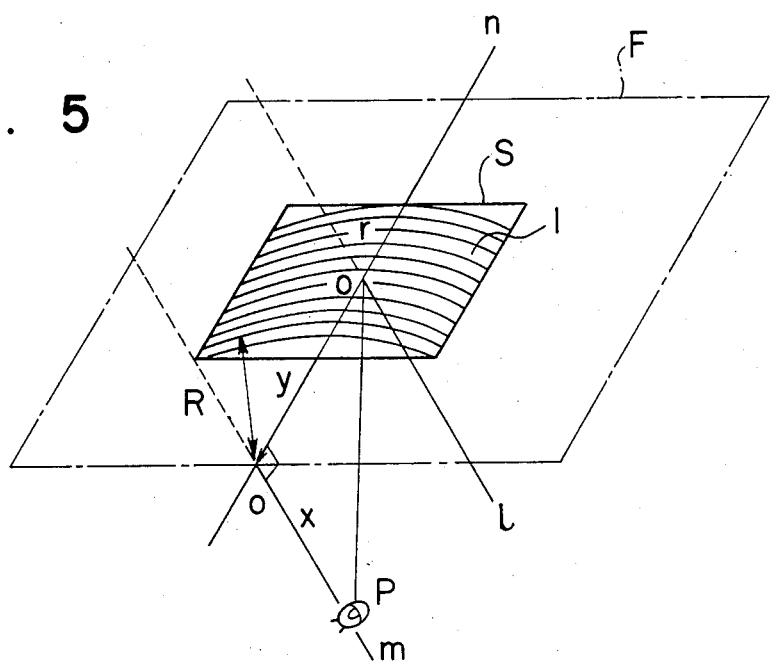
FIG. 5 is a view for explaining a screen adapted to be used in a preferred embodiment according to the present invention.

Referring to FIG. 5 in which a rear projection screen system of the present invention is generally shown, including a rear projection screen S on which arcuate prisms 1 coaxially extending in the horizontal direction are formed.

In this embodiment the rear projection screen S receives light from a light source P positioned therebelow in the rear thereof so that the light is projected onto the rear surface of the screen S, obliquely upward, and therefore, the arcuate form of the prisms is convex upward. Meanwhile it is possible to project light obliquely downward. However, in this case, the arcuate form of the prisms is convex downward. Further, it is noted that the prisms may take a straight shape extending horizontal direction, being arranged in parallel with each other.

In the above-mentioned arrangement shown in FIG. 5 assuming that the light source for projection, e.g. a CRT, is P and the center of the concentric circular arc in a plane F including the screen S is 0, and if a segment OP is made perpendicular to the plane F, each point on the same arc becomes equidistant from the light source P. Consequently, by making the cross sections of the prism 1 along this circular arc identical, the angles of emergence from the cross sections of the prism become equal, resulting in the design of the rear projection screen becoming less complicated, and, furthermore, it is possible to realize a well-balanced screen S which is capable of controlling the light not only in the vertical direction but also in the horizontal direction. In FIG. 5, reference character O denote the center of the screen S.

Assuming now that horizontal distance between the light source P and the center O' of the arcs is x and the vertical distance between the center O of the screen S and the center O' of the arcs is y, as shown in FIG. 5, the open angle of the prism at a point having distance $\gamma$(upwardly positive) from the center of the vertical axis passing through the center O of the screen is $\theta_1$, and the inclination of the light incidence surface of the prism is $\theta_2$, then $\theta_2$ in the case of parallel emergence can be obtained by the following Formula 1 (wherein n is an index of refraction):

$$\tan \theta_2 = \left\{ \frac{(r + y)}{\sqrt{x^2 + (r + y)^2}} + n \sin 2\theta_1 \right\} / \left\{ \frac{x}{\sqrt{x^2 + (r + y)^2}} - n \cos 2\theta_1 \right\} \quad (1)$$

If the cross-sectional configuration of the prisms 1 is made into one expressed by the above Formula (I) all the rays of light emerging from the surface of the screen S become parallel rays of light which are normal to the screen S. Hence, it becomes possible to obtain a screen which is more compact and displays a more uniform brightness as compared with a conventional screen having a Fresnel lens.

It is convenient for expalaining the general configuration of the arcuate prisms formed on the rear surface of the screen to consider a main principle line which extends on the rear surface of the screen, passing through the center O of the latter and crossing the optical axis OP of the light source at the center O. From this consideration the main principal line crosses inevitably orthogonal to the above-mentioned arcuate prisms at least at the crossing point therebetween. It is noted that the this principal line is coincident with the line OO' as shown in FIG. 5 if the rear surface of the screen is flat. However, from the general aspect of the present invention, the main principal line does not coincide with the line OO' in the screen according to the present invention since the screen is concavely curved at least on the rear surface thereof. Further, as mentioned before, the light rays impinge upon the rear surface of the screen at relatively large angles in order to provide a compact arrangement to a rear projection screen apparatus. Accordingly, the principal line crosses the optical axis of the light source at a steep angle.

Figure 7:
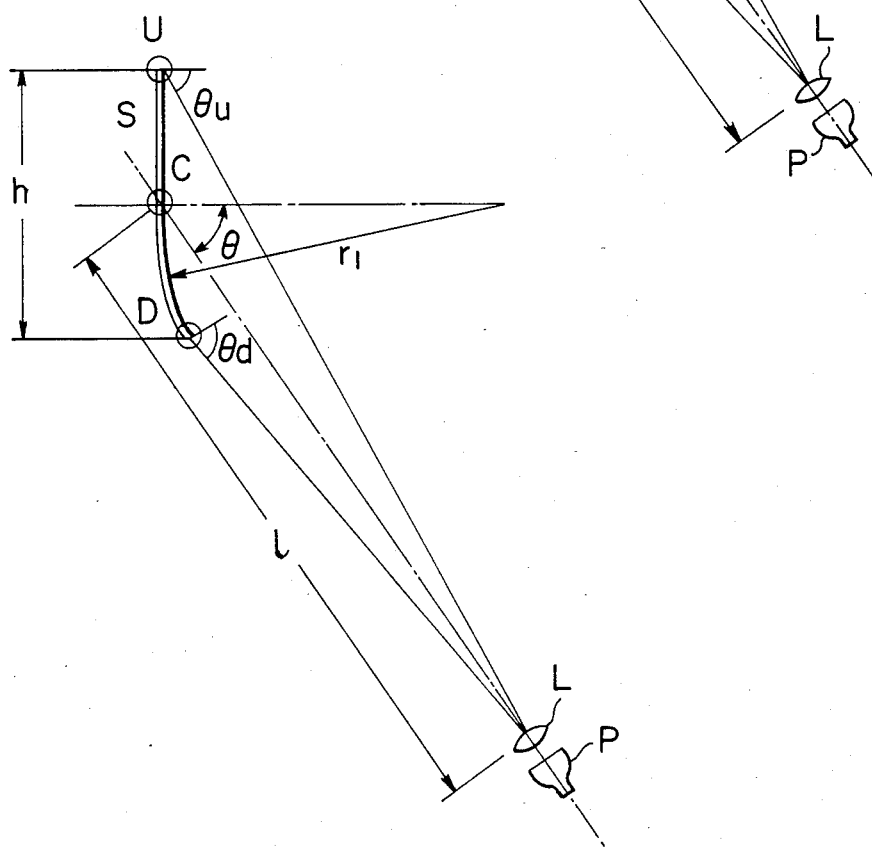
FIGS. 7 and 8 are schematic side elevational views illustrating a rear projection screen system in one embodiment according to the present invention.

Referring to FIG. 7 from which the essential arrangement of this embodiment is clearly understandable, the rear projection screen S has a cross-sectioned shape which is curved in the lower half section thereof, that is convex in the direction toward the viewing side but the rear surface of the screen has a concave shape.

Figure 6:
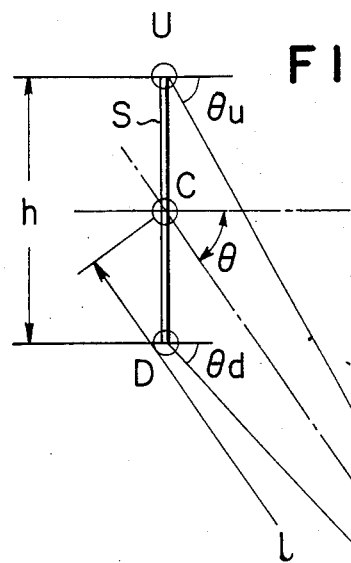
FIG. 6 is a schematic side-elevational view illustraining a conventional rear projection screen system utilizing a rear projection screen corresponding to the one shown in FIG. 5.
Figure 8:
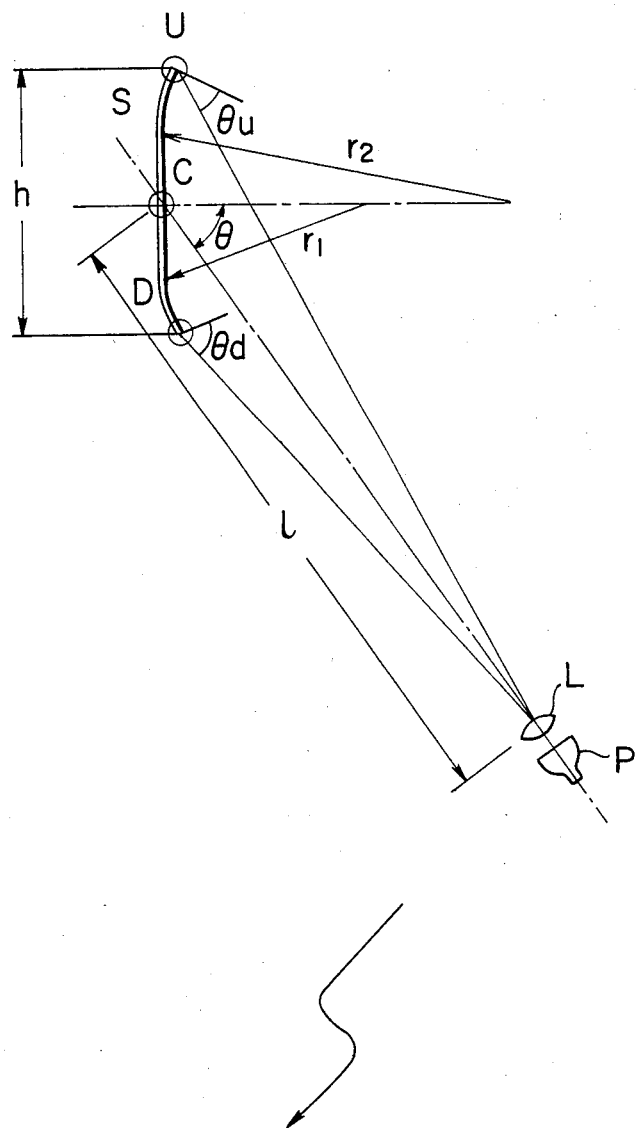

Comparison will be made to the arrangement shown in FIG. 7 with respect to the conventional one as shown in FIG. 6. For the purpose of the comparison, there were prepared a conventional rear projection screen as a comparison example, as shown in FIG. 6 and two reference examples, as shown in FIG. 7 and FIG. 8, of the rear projection screen of the present invention. Result of the comparison is shown in Table 1.

COMPARATIVE EXAMPLE

A transparent acrylic resin sheet having a refraction index of 1.49 and a thickness of 3 mm was prepared, which was subjected to a heating press moulding process to produce a rear projection screen having arcuate prisms. In this example, the specification and the positional relationship with a light source of the prisms were as follows, and its arrangement was as shown in FIG. 5.

Position of the light source:
x rearward of the screen=570 mm
y downward of the center of the screen=820 mm
(Light rays made to be incident upon the center of the screen at an angle of 55 deg. with respect to the rear surface of the screen.)
Apex angle of the prism $\theta_1$=45 deg.
Center of the circular arc of the prism: 820 mm downward from the center of the screen
Pitch of the prism: P=0.5 mm
Size of the screen: 600 mm (height) 800 mm (width)

The angle of $\theta_2$ of inclination of each prism was set to the angle calculated from Formula (1). While the above-mentioned conditions were all satisfied, this example was arranged such that all light rays emerges from the screen surface in the direction normal thereto.

The thus formed rear projection screen was arranged as shown in FIG. 6 to measure the efficiency of light at points U, C and D. As understand from the table 1, row ① it was confirmed, in this example, that the efficiency of light was lowered at the point D.

REFERENCE EXAMPLE 1

A similar rear projection screen (S) as explained in the comparison example was prepared, excepting that the lower half thereof is curved below the point C as shown in FIG. 7 so at to form a curved surface which is convex toward the viewing side, having a radius $\gamma_1$ of curvature of 1,500 mm, and was arranged as mentioned in the comparison example to evaluate the efficiency of light at the points U, C, D. The result of the evaluation is denoted in the Table 1, row ② from which it is understandable that the rear projection screen in this reference example offers 100% efficiency at either of the points U, C, D.

EXAMPLE 2

A rear projection screen similar to the one explained in the reference example 1 was prepared, having its lower half section curve so as to have a radius of curvature of 1,500 mm and its upper half section also curved to have a radius $\gamma_2$ of curvature of 2,000 mm as shown in FIG. 8, which is more advantageous in image projection since the curvature of the rear projection screen is uniform at several points thereon. Then, the efficiency of light was evaluated at the points U, C, D for this rear projection screen. The result of the evaluation is shown in the table 1, row ③ from which it is understandable that 100% light efficiency is obtained at either of these three points U, C, D.

TABLE 1

| | EVALUATION ITEMS AND RESULTS | | |
|---|---|---|---|
| | MEASURING POINT* | INCIDENCE ANGLE | LIGHT EFFICIENCY** % C |
| 1 COMPARATIVE EXAMPLE 1 | U | $\theta_u$ = 63 deg. | 100 |
| | C | $\theta_c$ = 55 deg. | 100 |
| | D | $\theta_d$ = 42 deg. | 74 |
| EXAMPLE 1 2 | U | $\theta_u$ = 63 deg. | 100 |
| | C | $\theta_c$ = 55 deg. | 100 |
| | D | $\theta_d$ = 55 deg. | 100 |
| EXAMPLE 2 3 | U | $\theta_u$ = 56 deg. | 100 |
| | C | $\theta_c$ = 55 deg. | 100 |
| | D | $\theta_d$ = 55 deg. | 100 |

Figure 1:
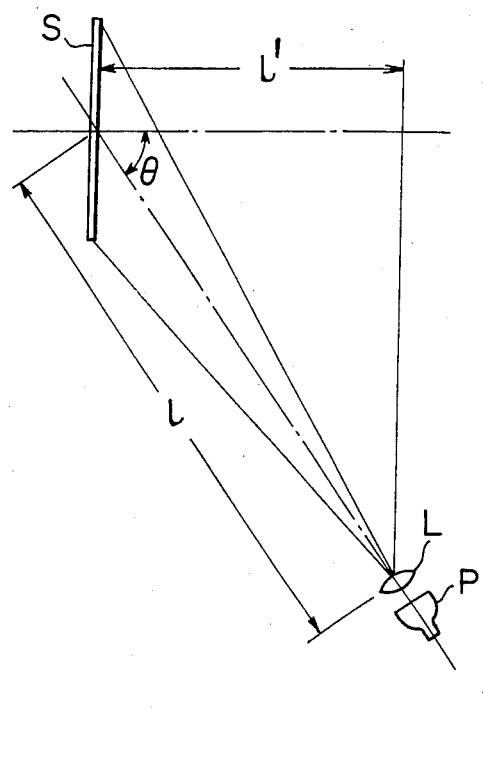
FIGS. 1, and 2A and 2B are schematic side elevational views for explaining a general behavior of a rear projection screen system of the type which receives light rays on the rear surface thereof at a relatively acute angle to the rear surface.
Figure 2A:
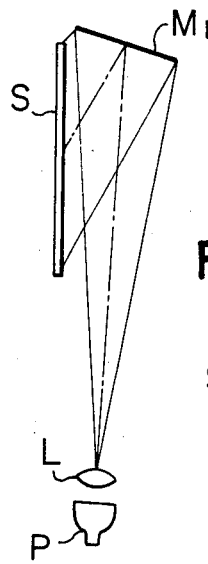
Figure 2B:
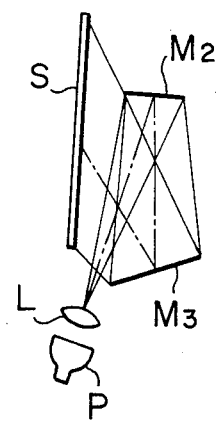
Figure 3:
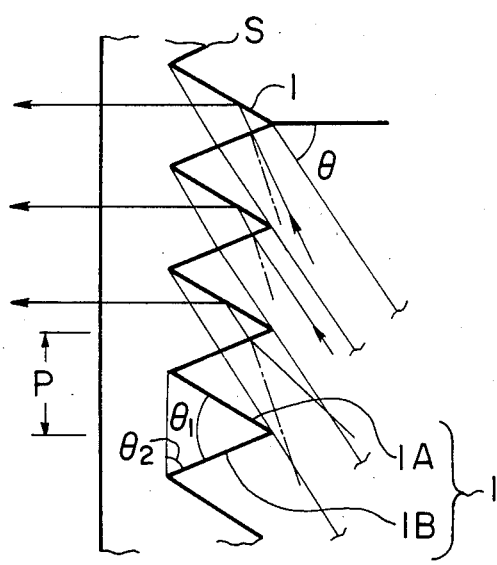
FIG. 3 is a cross-sectional view illustrating a part of a rear projection screen adapted to be used in the rear projection screen system shown in FIGS. 1 and 2.
Figure 4:
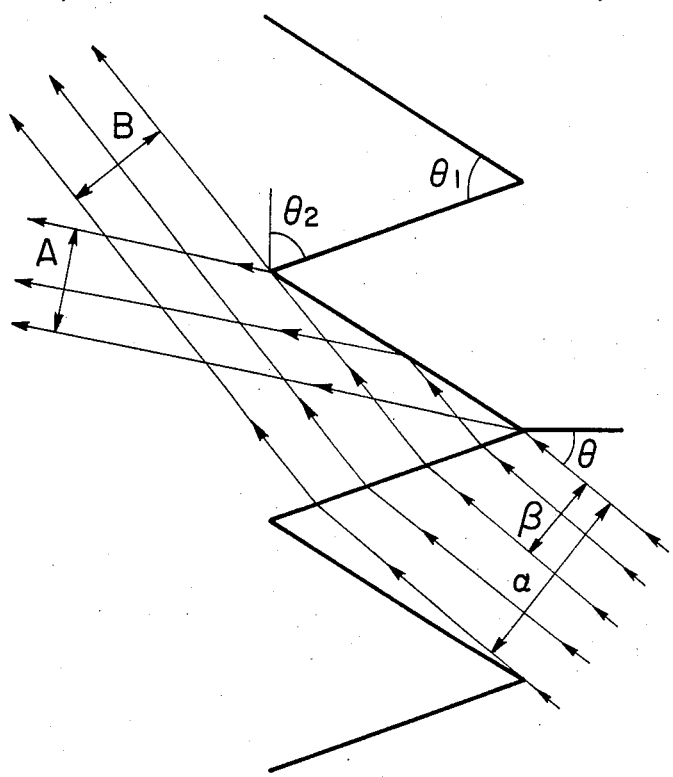
FIG. 4 is an enlarged cross-sectional view illustrating the part of the rear projection screen as shown in FIG. 3.

NOTE:
*Measuring points are shown in FIGS. 6 and 8, respectively.
**Light Efficiency was obtained by the formula: $\beta/\alpha \times 100$ (%) at each point U, C, D as shown in FIG. 4.

As mentioned above, by estimating a main principle line (n) extends on the rear surface of the rear projection screen S, crossing the optical axis of the light source P at the center point of the screen S (refer to FIG. 5), at least the rear surface of the screen S is curved in cross-section along the main principle line (n) such that it is convex toward the viewing side. With this arrangement, the screen S according to the present invention can give uniform brightness since the light efficiency with respect to the incidence light can be maintained at every point on the screen S.

It is noted that the rear projection screens shown in FIGS. 7 and 8 can be formed by a hot-press moulding process although it is also possible to forcedly curve them.

Figure 9:
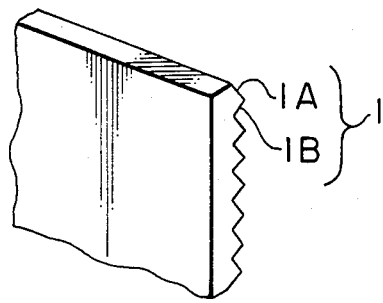
FIGS. 9 to 12 are perspective views partly illustrating various other embodiments according to the present invention.
Figure 10:
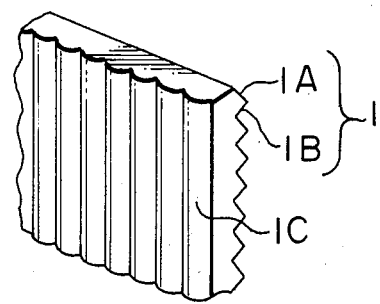
Figure 11:
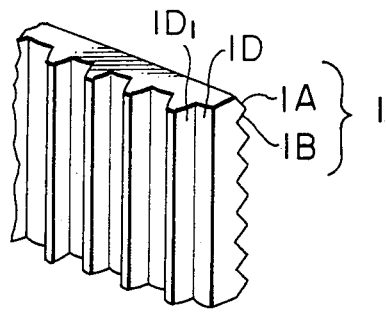
Figure 12:
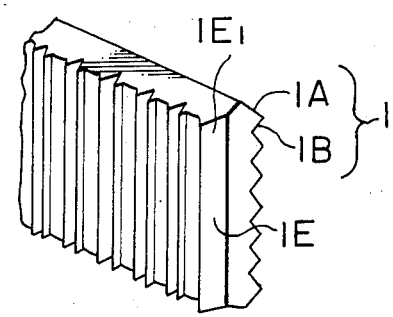

FIGS. 9 to 14 show various embodiments, in part, of the present invention. FIG. 9 shows a most basic rear projection screen, in which are formed a plurality of prisms 1 each having a total reflection surface 1A and an incidence surface 1B on the projection side. FIG. 10 shows a rear projection screen in which a lenticular lens surface 1C extending vertically is formed on the viewing side in the embodiment shown in FIG. 9, and this lenticular lens surface 1C imparts the horizontally diffusing characteristics of the light. In addition, FIGS. 11 and 12 show rear projection screens in which lenticular lens surfaces 1D, 1E having total reflection surfaces $1D_1$, $1E_1$ are similarly formed on the viewing side thereof, respectively, thereby making it possible to obtain even greater horizontal diffusing characteristics of light, i.e., a greater field of vision.

Further, such total reflection surfaces formed in the lenticular lens surface allow the light rays totally reflected thereon to emerge from the screen over a wide viewing angle, and therefore to cross each other so that it is possible to enhance the mixing of colors in the case of color television sets. Since the arrangement and operation of lenticular lens surfaces 1D, 1E having total reflection surfaces shown in FIGS. 11 and 12 are described in detail in Japanese patent application Nos. 51194/1981 and 90544/1981, (corresponding to U.S. Pat. No. 4,418,986), 91896/1981, (corresponding to U.S. Pat. No. 4,469,402), 212584/1981, 29178/1981 (corresponding to U.S. Pat. No. 4,468,092) and 59389/1982 filed by the applicants, description of them will be omitted herein.

Figure 13:
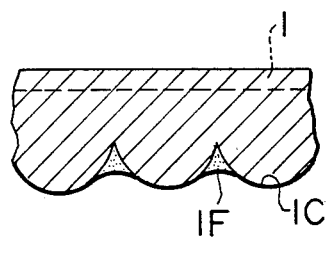
FIGS. 13 and 14 are partially cross-sectional views partly illustrating various other embodiments according to the invention.
Figure 14:
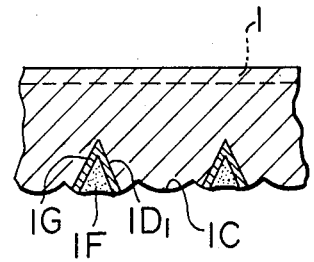
Figure 15:
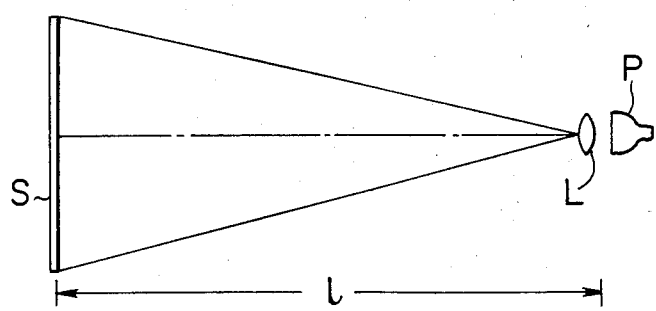
FIG. 15 and FIGS. 16A through 16C are schematic side elevational views illustrating conventional rear projection screen systems.
Figure 16A:
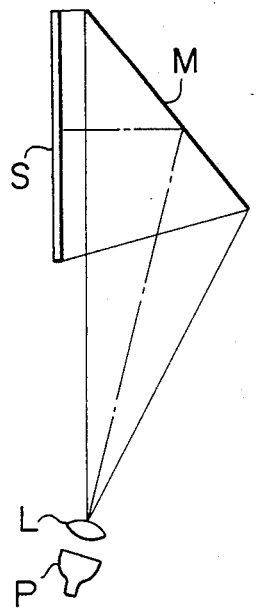
Figure 16B:
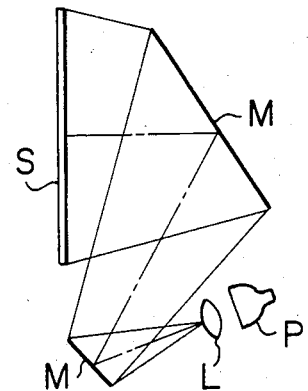
Figure 16C:
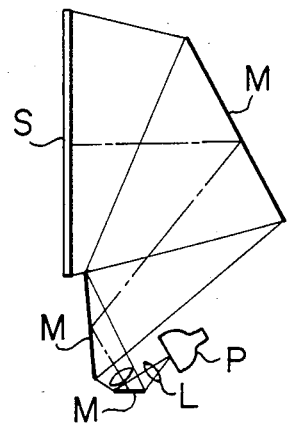

If a lenticular lens surface is formed on the viewing side, as shown in the embodiments of FIGS. 10 to 12, a portion which does not transmit light is formed on the lens surface, and an external light absorbing layer 1F may be formed by making use of this light nontransmissive portion, as shown in FIG. 13. In addition, if a lenticular lens surface having a total reflection surface is formed, as shown in FIGS. 11 and 12, it is possible to ensure that the light does not substantially emerge from this total reflection surface, so that an external light absorbing layer can be provided to this total reflection surface. In this case, the external light absorbing layer 1F may be provided via a reflection layer 1G made of a material having a smaller index of refraction than that of a substrate, as shown in FIG. 14, so that the function of the total reflection surface will not be deteriorated.

It is noted that all screens mentioned above are formed in a curved cross-sectioned shape which is convex toward the viewing side.

In the afore-mentioned embodiments, prisms 1 are disposed continuously such as to extend in a substantially horizontal direction, but the prisms 1 can be also arranged such as to extend in the substantially vertical direction by being turned by 90 deg. It goes without saying that the projector or light source should be disposed in the transverse direction in this case.

With the rear projection screen according to the present invention, since an image is projected diagonally from the rear, a distortion may occur in the image and the fading of the image will occur. However, these problems can be overcome by taking the following measure in the projection system. In other word, the distortion of the image may be corrected by the electrical circuit of a CRT by taking account of an amount of distortion for each portion. Meanwhile, since the fading of the image results owing to a difference in the distance between the lens system and the screen, an image introduced from the CRT to the lens system may be given a predetermined angle with respect to the optical axis in such a manner as to form an equal focal length on the screen.

As to a material used for the rear projection screen of the present invention, acrylic resin is the most suitable. The reason is that acrylic resin is particularly superior in terms of optical and fabrication characteristics, and fabrication efficiency while having a suitable rigidity. However, instead of acrylic resin, it is also possible to use polyvinyl chloride resin, polycarbonate resin, olefin resin, and styrene resin. When these synthetic resin materials are used, it is possible to fabricate a rear projection screen pertaining to the present invention by means of extrusion molding, heating press, or injection molding.

Furthermore, a light diffusing means for further enhancing the light diffusing characteristics may be added to the base material the rear projection screen of the present invention separate sheet. As for this light diffusing means, one or two or more kinds of additives of diffusing materials which are not dissolved in or undergo chemical change by a liquid synthetic resin syrup and molten medium, including $SiO_2$, $CaCO_3$, $Al_2O_3$, $TiO_3$, $BaSO_4$, $ZnO$, $Al(OH)_3$, fine glass powders, and an organic diffusing agent, may be mixed and distributed in the medium such as to be dispersed uniformly in a synthetic resin constituting the substrate, e.g., acrylic resin, or a layer including such diffusing materials may be provided to the screen. Furthermore, it is also effective to form a fine matted surface on the projection-side screen surface and/or the viewing-side screen surface. If such a means for imparting light diffusing characteristics is adopted, the diffusion of light in the horizontal and vertical directions of the screen can be compensated, thereby enabling enhancement of the uniformity of the diffusion of light.

It has been explained that the total reflection surface is formed in each of prisms in order to reflect incident light rays toward the viewing side of the screen. Although a remarkable advantage can be expected with the above-mentioned arrangement, it is also possible to use a metalic reflection surface, etc., for attaining the same function as that of the total reflection surface.

The present invention having the aforementioned arrangements has advantages in that, since light introduced onto the rear surface of the screen at a sharp angle can be emerged uniformly from the viewing surface with high efficiency by virtue of the configuration of the prisms and the action of the internal reflection, it becomes possible to locate the relative position of a projector serving as a light source diagonally rearward when the rear projection screen of the present invention is used, thereby making it possible to make the entire projector compact, and that a rear projection screen exhibiting a uniform brightness can be provided easily.

What is claimed is:

1. A rear projection screen having a front surface and a rear surface, in a rear projection screen apparatus which emerges light rays to be viewed to a viewing side, and which includes a light source with an optical axis along which light rays are projected onto said rear surface of said rear projection screen, said front surface of said rear projection screen confronting said viewing side, said rear surface of said rear projection screen having a principal line extending thereon and crossing the optical axis of said light source at a relatively steep angle, and being formed thereon with several prisms arranged in parallel with each other and being substantially orthogonal to the principal line at least crossing points therebetween, each of said prism having an incidence surface through which the light rays from said light source are introduced into said prism, and a reflection surface upon which the light rays introduced are reflected to be directed toward said front surface of the rear projection screen, and further said rear surface being formed in a concave cross-sectioned shape along said principal line.

2. A rear projection screen apparatus as set forth in claim 1, wherein said reflection surface is formed thereon with a total reflection surface.

3. A rear projection screen apparatus as set forth in claim 1, wherein said prisms are horizontally extended.

4. A rear projection screen apparatus as set forth in claim 1, wherein said prisms are arcuate so as to be concentrically extended.

5. A rear projection screen apparatus as set forth in claim 1, further comprising lenticular lens surfaces vertically extending on said front surface.

6. A rear projection screen apparatus as set forth in claim 5, wherein said lenticular lens surfaces are provided with total reflection surfaces.

7. A rear projection screen apparatus as set forth in claim 5, wherein an external light absorbing layer is formed on a light nontransmissive part of said each lenticular lens surface.

8. A rear projection screen apparatus as set forth in claim 7, wherein said external light absorbing layer is formed on said total reflection surface of said each lenticular lens surface through a light reflecting layer.

9. A rear projection screen apparatus as set forth in claim 1, wherein a substance constituting said screen is provided with a light diffusing means.

10. A rear projection screen as set forth in claim 1, wherein an additional sheet having a viewing side and a light source side and having a light diffusing function is laid on the viewing side of said screen.

11. A rear projection screen as set forth in claim 10, wherein said additional sheet is formed with lenticular lenses on at least the viewing side thereof.

12. A rear projection screen as set forth in claim 10, wherein said additional sheet is formed with a Fresnel lens on at least on the light source side thereof.

13. A rear projection screen as set forth in claim 10, wherein said additional sheet is formed with lenticular lenses on the viewing side, and with a Fresnel lens on the light source side.

* * * * *